United States Patent
Choi et al.

(10) Patent No.: US 12,138,747 B2
(45) Date of Patent: Nov. 12, 2024

(54) PLANARIZATION PROCESS, APPARATUS AND METHOD OF MANUFACTURING AN ARTICLE

(71) Applicant: CANON KABUSHIKI KAISHA, Tokyo (JP)

(72) Inventors: Byung-Jin Choi, Austin, TX (US); Ozkan Ozturk, Round Rock, TX (US); Masaki Saito, Austin, TX (US); Seth J. Bamesberger, Austin, TX (US)

(73) Assignee: CANON KABUSHIKI KAISHA, Tokyo (JP)

( * ) Notice: Subject to any disclaimer, the term of this patent is extended or adjusted under 35 U.S.C. 154(b) by 78 days.

(21) Appl. No.: 17/748,859

(22) Filed: May 19, 2022

(65) Prior Publication Data
US 2023/0373065 A1    Nov. 23, 2023

(51) Int. Cl.
*B25B 11/00* (2006.01)
*B23B 31/30* (2006.01)

(52) U.S. Cl.
CPC .......... *B25B 11/005* (2013.01); *B23B 31/307* (2013.01)

(58) Field of Classification Search
CPC ..... B25B 11/00; B25B 11/005; B25B 11/007; H01L 21/6838; H01L 31/02366; B23B 31/307

USPC ................ 269/21, 30, 289 R, 900; 29/559
See application file for complete search history.

(56) References Cited

U.S. PATENT DOCUMENTS

| | | | |
|---|---|---|---|
| 5,857,667 A | 1/1999 | Lee | |
| 7,028,999 B2* | 4/2006 | Sunadome | B23Q 16/001 269/900 |
| 9,558,985 B2 | 1/2017 | Wang et al. | |
| 9,778,578 B2 | 10/2017 | Meissl et al. | |
| 2004/0090611 A1 | 5/2004 | Choi et al. | |
| 2004/0141163 A1 | 7/2004 | Bailey et al. | |
| 2005/0264134 A1 | 12/2005 | Ganapathisubramanian et al. | |
| 2006/0172031 A1 | 8/2006 | Babbs et al. | |
| 2011/0001954 A1 | 1/2011 | Ganapathisubramanian et al. | |
| 2021/0050245 A1 | 2/2021 | Choi et al. | |
| 2021/0050246 A1* | 2/2021 | Choi | H01L 21/67132 |

* cited by examiner

*Primary Examiner* — Brian D Keller
*Assistant Examiner* — Alberto Saenz
(74) *Attorney, Agent, or Firm* — CANON U.S.A., INC. IP DIVISION (57) ABSTRACT

A planarization apparatus comprising a superstrate chuck is provided. The superstrate includes a plurality of inner lands protruding from a surface of the superstrate chuck and a peripheral land protruding from the surface of the superstrate chuck along a periphery of the superstrate chuck and encircling the inner lands therein. The peripheral land has a height smaller than a height of each of the inner lands. The peripheral land has a width sufficiently larger than a width of each of the inner lands such that a pressure leakage through the peripheral land is controlled to be less than a threshold.

7 Claims, 8 Drawing Sheets

PLANARIZATION PROCESS, APPARATUS AND METHOD OF MANUFACTURING AN ARTICLE

BACKGROUND

Field of Art

The present disclosure relates to substrate processing, and more particularly, to the planarization of surfaces in semiconductor fabrication.

Description of the Related Art

Planarization techniques are useful in fabricating semiconductor devices. For example, the process for creating a semiconductor device includes repeatedly adding and removing material to and from a substrate. This process can produce a layered substrate with an irregular height variation (i.e., topography), and as more layers are added, the substrate height variation can increase. The height variation has a negative impact on the ability to add further layers to the layered substrate. Separately, semiconductor substrates (e.g., silicon wafers) themselves are not always perfectly flat and may include an initial surface height variation (i.e., topography). One method of addressing this issue is to planarize the substrate between layering steps. Various lithographic patterning methods benefit from patterning on a planar surface. In ArF laser-based lithography, planarization improves depth of focus (DOF), critical dimension (CD), and critical dimension uniformity. In extreme ultraviolet lithography (EUV), planarization improves feature placement and DOF. In nanoimprint lithography (NIL) planarization improves feature filling and CD control after pattern transfer.

A planarization technique sometimes referred to as inkjet-based adaptive planarization (IAP) involves dispensing a variable drop pattern of polymerizable material between the substrate and a superstrate, where the drop pattern varies depending on the substrate topography. A superstrate is then brought into contact with the polymerizable material after which the material is polymerized on the substrate, and the superstrate removed. Improvements in planarization techniques, including IAP techniques, are desired for improving, e.g., whole wafer processing and semiconductor device fabrication.

SUMMARY

A planarization apparatus is provided. The planarization apparatus comprises a superstrate chuck. The superstrate chuck includes one or more of inner lands protruding from a surface of the superstrate chuck, and a peripheral land protruding from the surface of the superstrate chuck along a periphery of the superstrate chuck and encircling the inner lands therein. The peripheral land has a height smaller than a height of each of the inner lands and a width sufficiently larger than a width of each of the inner lands such that a flow rate of gas through a gap bounded on one side by the peripheral land is controlled to be less than a threshold. The height of the peripheral land is sufficiently smaller than the height of the inner lands to create a positive curvature at an outer edge of the superstrate held by the superstrate chuck while spreading a formable material on a substrate. The height of the peripheral land is also sufficiently smaller than the height of the inner lands to initiate and propagate a crack between a superstrate held by the superstrate chuck and a formable material. In one embodiment, the height of the peripheral land is about 1 to 100 microns smaller than the height of the inner land.

The peripheral land preferably has an outer diameter greater than a diameter of the superstrate. The width of the inner land is about 0.1 mm to about 1.0 mm, and the width of the peripheral land is about 2.0 mm to about 10.0 mm. The width of the peripheral land is at least five times larger than the width of the inner land. The surface of the peripheral land distal to the surface of the superstrate chuck may include a multi-step structure. The height of the peripheral land may be reduced step-by-step from an inner edge to an outer edge of the peripheral land. The peripheral land may include a highest step at an outer edge and a lowest step between the outer edge and an inner edge of the peripheral land.

A method including the following steps is provided. A superstrate held with a superstrate chuck is brought into contact with a formable material on a substrate, and a bending zone is created at an outer edge of the superstrate by a recessed peripheral land formed along a periphery of the superstrate chuck. The formable material is cured. To separate the superstrate from the formable material, a separation crack is initiated between the cured formable material and the superstrate while maintaining a flow of gas between the recessed peripheral land and the superstrate below a predetermined threshold while the separation crack propagates around a circumference of the substrate by the recessed peripheral land with a sufficient width. The superstrate is re-chucked with the superstrate chuck with a center of the superstrate chuck radially offset from a center of the superstrate. In the above method, the separation crack is initiated without using a notch in the wafer. The peripheral land is not in contact with the superstrate prior to initiating the separation crack. The peripheral land is in contact with the superstrate after the separation crack is formed.

A method of manufacturing an article including the following steps is provided. A formable material is applied on a substrate. A superstrate is retained with a superstrate chuck and brought into contact with the formable material to create a bending zone at an outer edge of the superstrate by a peripheral land formed along a periphery of the superstrate chuck. The peripheral land having a height shorter than a plurality of inner lands circumferenced by the peripheral land. A curing process is performed on the formable material. A separation crack is initiated between the cured formable material and the superstrate while maintaining a flow rate of gas through a gap on one side by the peripheral land below a predetermined threshold while separation crack propagates around a circumference of the substrate by the peripheral land with a sufficient width. The superstrate is then separated from the formable material.

These and other objects, features, and advantages of the present disclosure will become apparent upon reading the following detailed description of exemplary embodiments of the present disclosure, when taken in conjunction with the appended drawings, and provided claims.

BRIEF DESCRIPTION OF DRAWINGS

So that features and advantages of the present invention can be understood in detail, a more particular description of embodiments of the invention may be had by reference to the embodiments illustrated in the appended drawings. It is to be noted, however, that the appended drawings only illustrate typical embodiments of the invention and are therefore not to be considered limiting of its scope, for the invention may admit to other equally effective embodiments.

Throughout the figures, the same reference numerals and characters, unless otherwise stated, are used to denote like features, elements, components or portions of the illustrated embodiments. Moreover, while the subject disclosure will now be described in detail with reference to the figures, it is done so in connection with the illustrative exemplary embodiments. It is intended that changes and modifications can be made to the described exemplary embodiments without departing from the true scope and spirit of the subject disclosure as defined by the appended claims.

DETAILED DESCRIPTION

Planarization System

Figure 1:
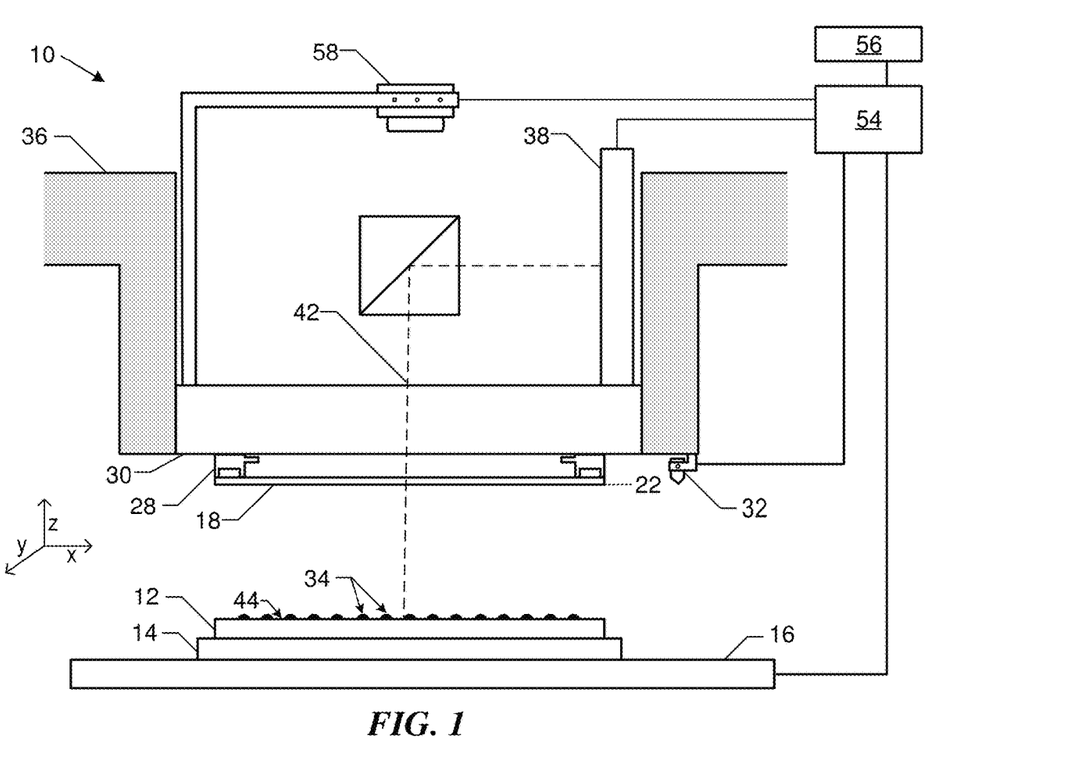
FIG. 1 is a diagram illustrating a planarization system.

FIG. 1 illustrates a planarization system 10 in which an embodiment may be implemented. The system 10 may be used to planarize the substrate 12 or form a relief pattern on substrate 12. Substrate 12 may be coupled to substrate chuck 14. As illustrated, substrate chuck 14 is a vacuum chuck. Substrate chuck 14, however, may be any chuck including, but not limited to, vacuum, pin-type, groove-type, electrostatic, electromagnetic, and/or the like.

The substrate 12 and the substrate chuck 14 may be further supported by positioning stage 16 The stage 16 may provide translational and/or rotational motion along one or more of the x, y, z, θ, and φ axes. The stage 16, the substrate 12, and the substrate chuck 14 may also be positioned on a base (not shown).

Spaced-apart from the substrate 12 is a superstrate 18 used to planarize the substrate. The superstrate is a flat planar member. In an alternative embodiment the superstrate 18 is a template 18. The template 18 may include a body having a first side and a second side with one side having a mesa (also referred to as mold) extending therefrom towards the substrate 12. The mesa may have a shaping surface 22 thereon. Alternatively, the template 18 may be formed without a mesa.

The template 18, that is, the superstrate 18, and/or the mold may be formed from such materials including, but not limited to, fused-silica, quartz, silicon, organic polymers, siloxane polymers, borosilicate glass, fluorocarbon polymers, metal, hardened sapphire, and/or the like. As illustrated, shaping surface 22 may be a planar surface or may comprise features defined by a plurality of spaced-apart recesses and/or protrusions, though embodiments of the present invention are not limited to such configurations. The shaping surface 22 may define any original pattern that forms the basis of a pattern to be formed on the substrate 12. The shaping surface 22 may be blank, i.e. without pattern features, in which case a planar surface can be formed on the substrate 12. In an alternative embodiment, when the shaping surface 22 is of the same areal size as the substrate, a layer can be formed over the entire substrate (e.g., whole substrate processing).

The superstrate 18 (template 18) may be coupled to a superstrate chuck 28 (template chuck 28). The superstrate chuck 28 may be configured as, but not limited to, vacuum, pin-type, groove-type, electrostatic, electromagnetic, and/or other similar chuck types. Further, the superstrate chuck 28 may be coupled to a head 30 which in turn may be moveably coupled to a bridge 36 such that superstrate chuck 28, the head 30 and the template 18 are moveable in at least the z-axis direction.

The system 10 may further comprise a fluid dispense system 32. Fluid dispense system 32 may be used to deposit a formable material 34 (e.g., polymerizable material) on substrate 12. The formable material 34 may be positioned upon the substrate 12 using techniques such as drop dispense, spin-coating, dip coating, chemical vapor deposition (CVD), physical vapor deposition (PVD), thin film deposition, thick film deposition, and/or the like. The formable material 34 may be disposed upon the substrate 12 before and/or after a desired volume is defined between the superstrate 18 (mold) and the substrate 12 depending on design considerations.

The fluid dispense system 32 may use different technologies to dispense the formable material 34. When the formable material 34 is capable of jetting, ink jet type dispensers may be used to dispense the formable material. For example, thermal ink jetting, microelectromechanical systems (MEMS) based ink jetting, valve jet, and piezoelectric ink jetting are common techniques for dispensing jettable liquids.

The system 10 may further comprise radiation source 38 that directs actinic energy along a path 42. The head 30 and the stage 16 may be configured to position the template 18 and the substrate 12 in superimposition with the path 42. A camera 58 may likewise be positioned in superimposition with the path 42. The system 10 may be regulated by a processor 54 in communication with the stage 16, the head 30, the fluid dispense system 32, the source 38, and/or the camera 58 and may operate on a computer readable program stored in a memory 56.

Either the head 30, the stage 16, or both vary a distance between the superstrate 18 (mold) and the substrate 12 to define a desired volume therebetween that is filled by the formable material 34. For example, head 30 may apply a force to template 18 such that the mold contacts the formable material 34. After the desired volume is filled with the formable material 34, the source 38 produces actinic energy (e.g., ultraviolet radiation) causing the formable material 34 to solidify and/or cross-link conforming to a shape of a surface 44 of the substrate 12 and the surface 22 of the template 18, defining a formed layer on the substrate 12.

Planarization Process

Figure 2A:
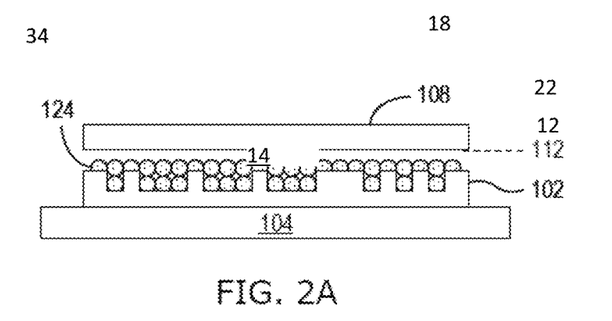
FIG. 2A to 2C illustrate a planarization process.
Figure 2B:
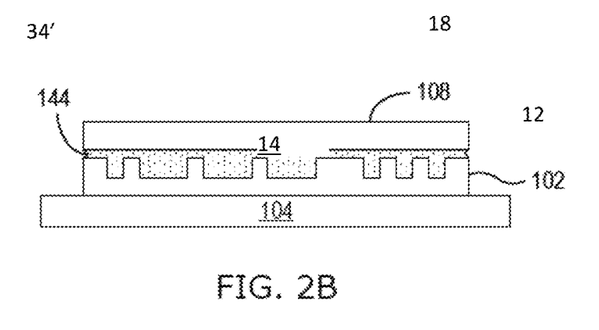
Figure 2C:
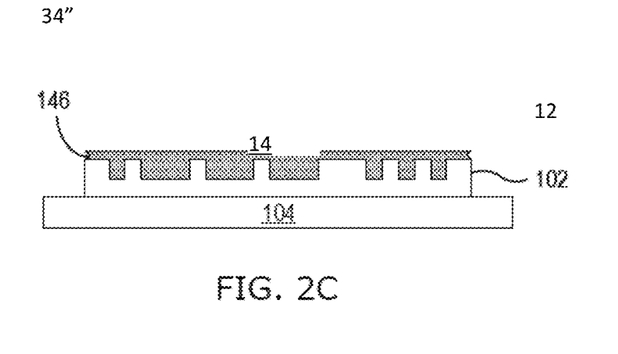

The planarization process includes steps which are shown schematically in FIGS. 2A to FIG. 2C which may make use of the planarization system 10 configured to perform the planarization process. As illustrated in FIG. 2A, the formable material 34 in the form of droplets is dispensed onto the substrate 12. As discussed previously, the substrate surface has some topography which may be known based on previous processing operations or may be measured using a profilometer, AFM, SEM, or an optical surface profiler based on optical interference effect like Zygo NewView 8200. The local volume density of the deposited formable material 34 is varied depending on the substrate topography. The superstrate 18 is then positioned in contact with the formable material 34. As used herein, template and superstrate are used interchangeably to describe an object with a shaping surface that is brought into contact with the formable material to control the shape of the formable material. As used herein, template chuck and superstrate chuck are used interchangeably to hold the template or the superstrate.

FIG. 2B illustrates a post-contact step after the superstrate 18 has been brought into full contact with the formable material 34 but before a polymerization process starts. The superstrate 18 is equivalent to the template 18 in FIG. 1 and is substantially featureless (may include alignment or identification features) and may be substantially the same size and shape as the substrate (a characteristic dimension such as average diameter of the superstrate may be within at least 3% of a characteristic dimension of the substrate). As the superstrate 18 contacts the formable material 34, the droplets merge to form a formable material film 34' that fills the space between the superstrate 18 and the substrate 12. Preferably, the filling process happens in a uniform manner without any air or gas bubbles being trapped between the superstrate 18 and the substrate 12 in order to minimize non-fill defects. The polymerization process or curing of the formable material 34 may be initiated with actinic radiation (e.g., UV radiation). For example, radiation source 38 of FIG. 1 can provide the actinic radiation causing formable material film 34' to cure, solidify, and/or cross-link, defining a cured planarized layer on the substrate 12. Alternatively, curing of the formable material film 34' can also be initiated by using heat, pressure, chemical reaction, other types of radiation, or any combination of these. Once cured, planarized layer 34" is formed, the superstrate 18 can be separated therefrom. FIG. 2C illustrates the cured planarized layer 34" on the substrate 12 after separation of the superstrate 18.

Superstrate Chuck

Figure 3:
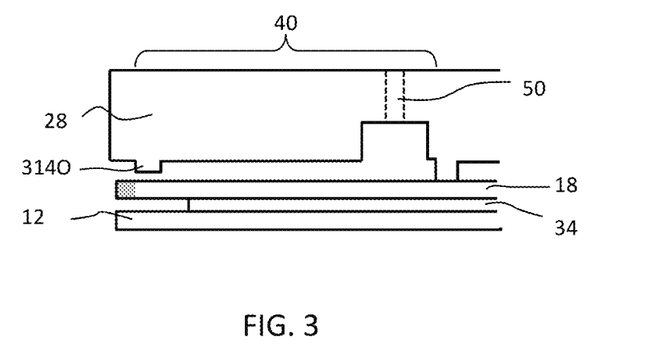
FIG. 3 is a cross-sectional view of a superstrate chuck with a narrow outer land.

The planarization apparatus as shown in FIG. 1 includes a substrate chuck 14 (a wafer chuck) for holding the substrate (e.g., wafer) 12. Typical thin land, for example, the thin outer land 314O land of the superstrate chuck 28 as shown in FIG. 3, and pin substrate chucks are ideal for small field nanoimprint applications; however, the thin land structure 314O at the outer edge of the superstrate chuck 28 may not be optimized for the planarization process or full wafer-to-wafer patterning (shaping). Specifically, in the planarization separation process, a superstrate chuck 28 having a thin recessed outer land limits the benefit of using a variety of superstrate diameters and requires a high flow to maintain a large negative vacuum pressure in the outer bend zone. To resolve this issue, a wide recessed land at the boundary of the superstrate chuck may be used to replace the thin recessed land. With the wide recessed land design, the superstrate chuck may be used to retain superstrate with different sizes. For example, as shown in FIG. 3, with an insufficient width of the recessed land, the edge of the superstrate (the shaded portion) extend beyond the recessed land may not be properly processed. The vacuum leakage at the periphery of the superstrate can be minimized, which results in a larger negative vacuum pressure in the bending zone i.e. leakage of environmental gases into the bending zone.

Figure 4A:
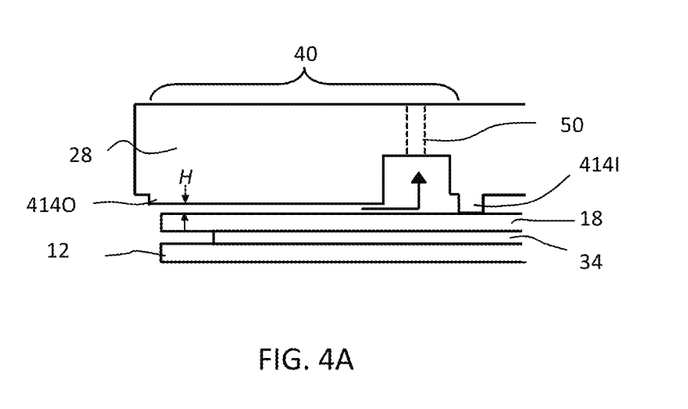
FIGS. 4A-B are cross-sectional views of a superstrate chuck with a wide outer land in one embodiment.

FIG. 4A is a cross sectional view of a superstrate chuck 28 having a wide outer land at a bend zone 40 according to one embodiment. In an embodiment, the bend zone 40 is from the outer diameter of the inner land to the outer diameter of the outer land. As shown, the superstrate chuck 28 includes an outer land 414O extending along a perimeter of the superstrate chuck 28. The outer land 414O is much wider than the outer land 314O as shown in FIG. 3. The outer land 414O has a height smaller than a height of the inner land 414I. In other words, the superstrate chuck 28 includes a wide, continuous, and recessed outer land 414O. The wide recessed land 414O along the perimeter of the superstrate chuck 28 has an outer diameter equal to or greater than a largest superstrate diameter. Therefore, the superstrate chuck 28 may be used to retain more sizes of superstrates during the planarization process. In one embodiment, the width of the outer land 414O is no smaller than 1 mm. In application, there may be an exclusion zone outside of a planarized area on the substrate. For example, for a 300 mm substrate, when the planarized area has a diameter of 296 mm, the radial width of the exclusion zone is 2 mm. In addition, a portion of the superstrate that is not in contact with the formable material on the wafer during planarization process is referred as "free span." For the same size of exclusion zone, increased superstrate diameter increases the free span. For example, with a 2 mm wafer exclusion zone on a 300 mm substrate, the free span is 2 mm for a 300 mm superstrate, while, the free span is 3 mm for a 302 mm superstrate. Less vacuum pressure is required in the bend zone to propagate the crack (after crack initiation) around the circumference with a larger superstrate free span using this wide land chuck design.

Figure 4B:
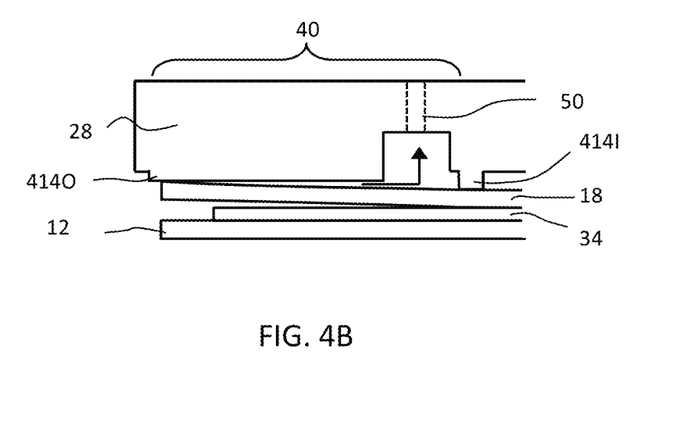
Figure 8:
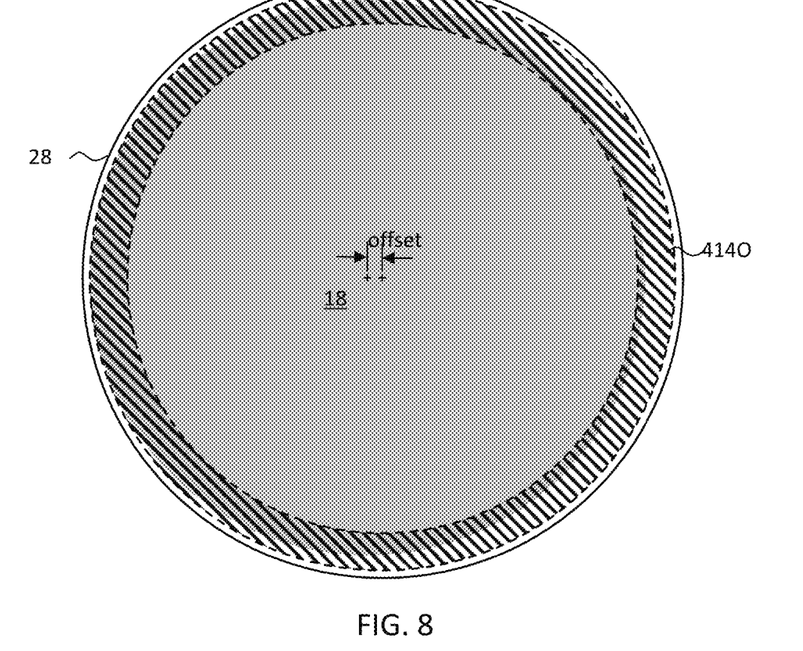
FIG. 8 shows a top down view of superstrate chuck with a wide outer land offset from the superstrate during the separation process.

During planarization process, vacuum is supplied from the channel 50 extending through the superstrate chuck 28 towards the contact side between the outer land 414O and the inner land 414I in the bend zone as shown in FIG. 4A, and the superstrate 18 bends and contacts with the inner land 414I and the outer land 414O of the superstrate chuck 28. As the outer land 414O is recessed with respect to a bottom surface of the inner land 414I, the superstrate 18 bends with a positive curvature at an outer edge extending towards the superstrate chuck 28 as shown in FIG. 4B, so as to prevent spreading related defects such as air voids in the planarization layer 34. If the superstrate 18 were to be held flat (without the recessed outer land 414O of the superstrate chuck 28) and released to complete spreading, spreading defects such as air voids from the trapped air would result in the planarization layer 34. The wide land 414O not only allows for compatibility with a wider range of superstrate diameters, but also allows a larger lateral superstrate loading tolerance during superstrate loading and re-chucking as illustrated in FIG. 8. As shown in the figure, a center of a superstrate 18 (grey circle) is shifted laterally with an offset distance from the center of the superstrate chuck 28 during the rechucking process. However, the offset superstrate 18 is still within the region of the recessed outer land 414O shown with a stripped pattern because the recessed outer land has a width that is wider than the offset distance. The wider outer land also enables offset rechucking which increases the lever arm when initiating the separation process.

During separation, a crack is initiated to separate the superstrate 18 from the wafer 12 at a localized area. The recessed outer land allows the superstrate 18 to bend away from the wafer 12 to initiate and propagate the crack along the perimeter of the superstrate 18 when the inner land 414I is in contact with the back surface of the superstrate 18. In an embodiment, a push pin on the wafer stage may for example pass through a notch in the substrate 12 to push on the superstrate 18 initiating the separation of the superstrate 18 from the planarization layer 34". During push-pin initiated separation, a certain threshold of negative pressure, for example, −80 kPa, is required in the bend zone to propagate the crack around the circumference or perimeter of the superstrate 18. The threshold of negative pressure may vary with various factors such as the temperature and the vacuum pressure applied around the peripheral land 414O.

Figure 5:
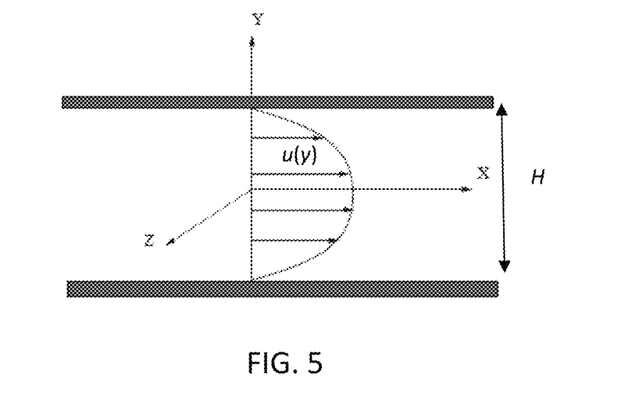
FIG. 5 shows the cross-section of a Plane Poiseuille Flow.

Before the superstrate 18 is re-chucked to the superstrate chuck 28, a small gap H exists between the superstrate 18 and the superstrate chuck 28. When vacuum is initially applied to the bend zone, a leak rate is inevitable at the interface due to the gap H. As a result, maximum pressure cannot be achieved and the crack may not propagate without reaching the minimum pressure threshold. Increasing the width of the recessed outer land 414O reduces the leak rate and increases the negative vacuum pressure in the bend zone 40. As understood, the leak rate is inversely proportion to the land width (dx) for a given pressure gradient. The leak rate is also proportional to the cubic of the recessed land height. The fluid flow between the recessed land 414O and the superstrate 18 can be described by plane Poiseuille flow as shown in FIG. 5. The flow rate Q' of gas (leak rate) bounded on one side by the recessed land 414O and on a second side by the superstrate 18 may be expressed as:

$$Q' = -\frac{dP}{dx}\frac{H^3}{12\mu}$$

The improved flow characteristics by changing thin outer land to wide continuous outer land has been verified by experimental data. In one embodiment, the inner land 414I may have a width of about 0.1 to about 1.0 mm. The width of the wide outer land 414O may be about 2.0 to about 10.0 mm. The distance between an inner edge of the outer land 414O to an outer edge of the closest inner land 414I may be about 2 to about 12 mm in the radial direction from the center of the superstrate chuck 28 (other exemplary distances are: 2, 4, 5, 5.5, 6, 6.5, 10, 10.5, 11, 11.5, 12 mm).

Figure 6:
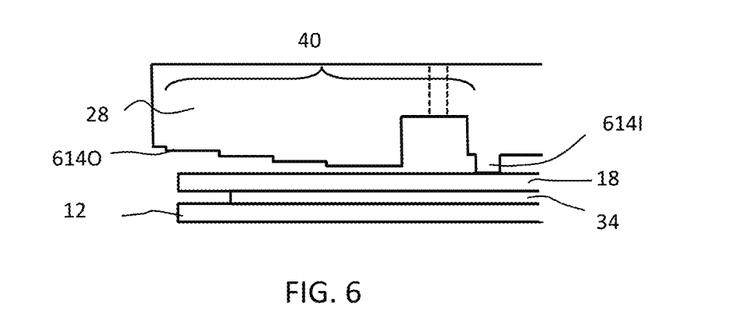
FIG. 6 is a cross-sectional view of a superstrate chuck with a wide outer land in another embodiment.
Figure 7:
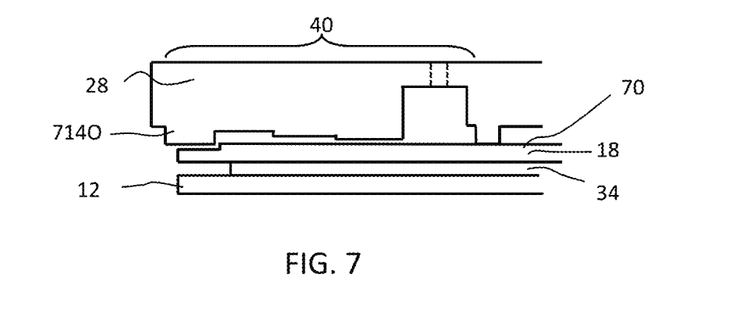
FIG. 7 is a cross-sectional view of a superstrate chuck with a wide outer land in another embodiment.

FIGS. 6 and 7 show examples of the wide outer lands with different heights. For example, FIG. 6 shows a wide outer land having step-like structure. The height of the wide outer land 614O increases step-by-step from the perimeter of the superstrate chuck 14 towards the inner land 614I. The multi-step land 614O allows the vacuum leakage to be further reduced. In FIG. 7, the superstrate 18 includes a mesa 70 formed on a back side, that is, the side opposite to contact side of the superstrate 18. The wide outer land 714O has multiple steps each may have a different height as shown in FIGS. 6-7. The multiple step structure as shown in FIG. 6 also improve reducing vacuum leakage.

Figure 9:
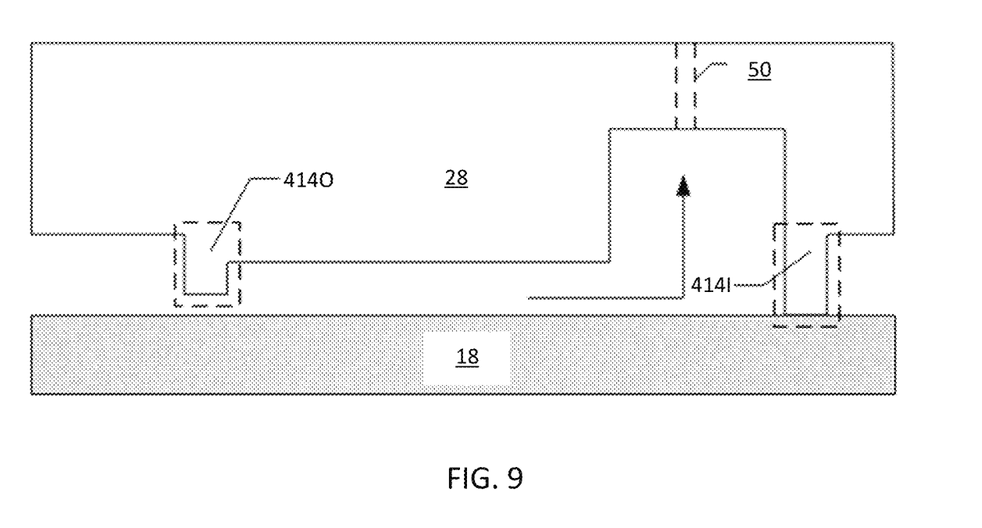
FIG. 9 is an enlarged cross-sectional view of the bend zone of the superstrate chuck having a wide outer land.
Figure 10:
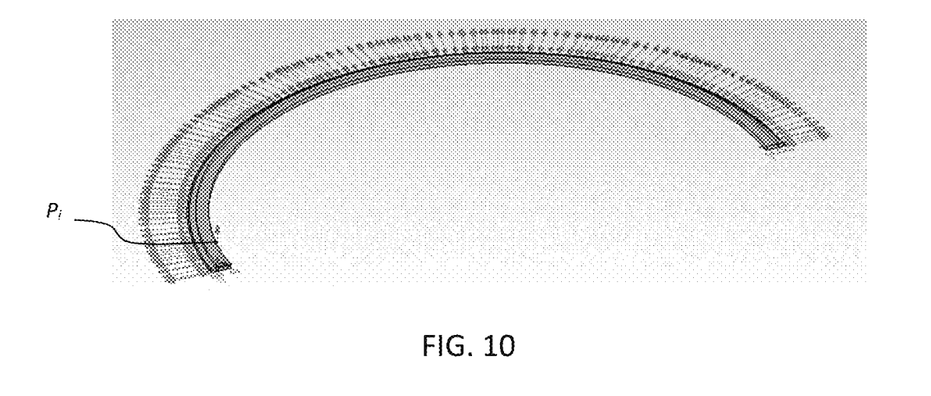
FIG. 10 shows the air flow along the edge of the superstrate chuck as shown in FIG. 10.
Figure 11:
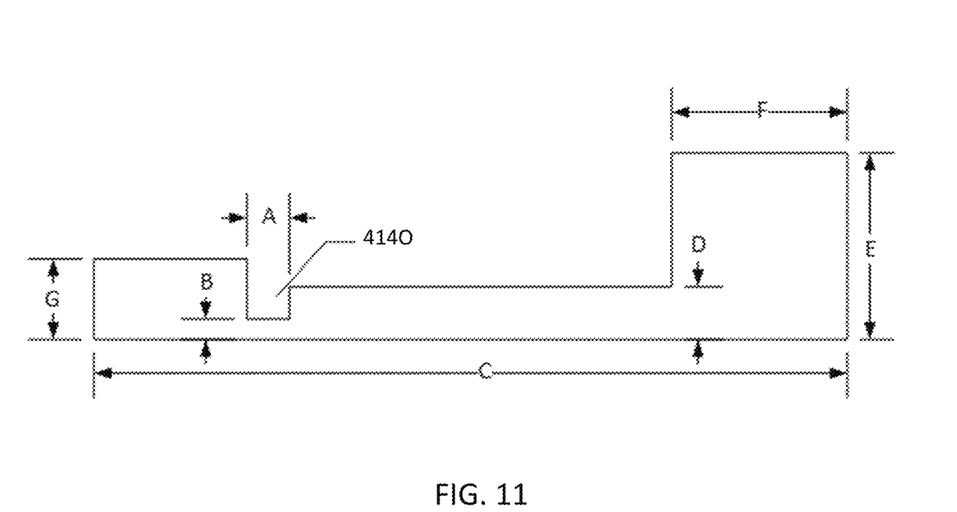
FIG. 11 shows a configuration of the superstrate chuck with a wide outer land.
Figure 12:
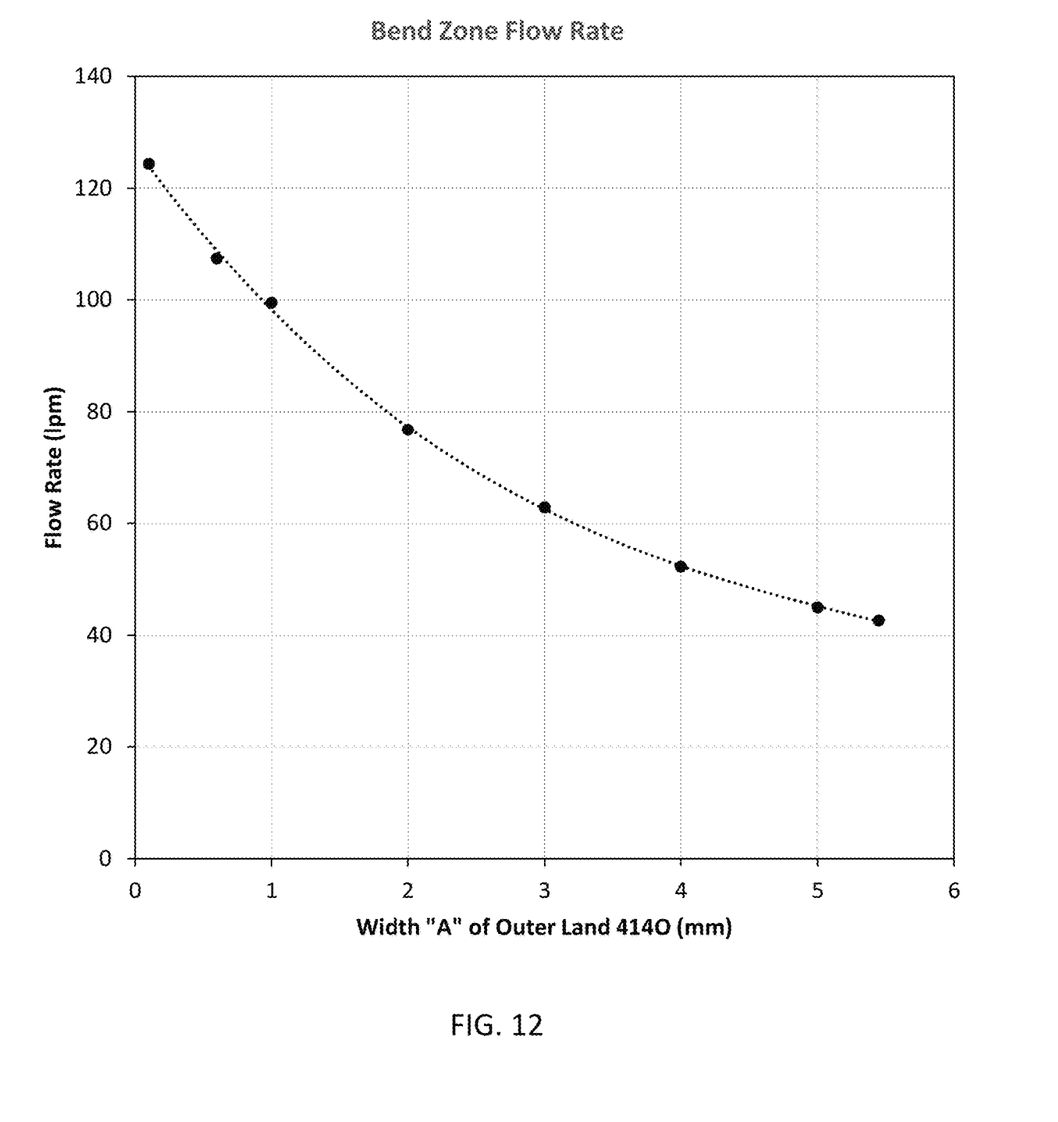
FIG. 12 is a graph showing the flow rate at the bend zone of the superstrate chuck as a function of the width of the outer land

FIG. 9 is an enlarged cross-sectional view of the bend zone of the superstrate chuck 28 with a narrow outer land 414O. FIG. 10 shows the air flow at the exterior of the bend zone. As discussed above, to initiate separation, a negative threshold pressure is required. In the embodiment as shown in FIGS. 9 and 10, the threshold negative pressure is about −80 kPa. FIG. 11 shows the space between the superstrate chuck with the outer land 414O and the trench through which the vacuum is applied from a vacuum source. In FIG. 11, the width A of the outer land 414, the height B of the outer land 404O, the width C of the bend zone, the height D of the channel along which the vacuum is applied, the height E of the trench through which the vacuum source is connected, the width F of the trench, and the height G of the gap between the rims of superstrate chuck and the superstrate are specified. Table I presented below shows the modelled flow rate in the bend zone. As shown in the table, the land height B, the bend zone width C, the channel height D, the trench height E, the trench width F, and the exterior gap G remain constant, while the width A of the outer land varies from 0.1 mm to 5.45 mm as shown Table presented below. FIG. 12 shows the graph of flow rate at the bend zone as a function of the width of the outer land 414O.

TABLE 1

| A (mm) | B (mm) | C (mm) | D (mm) | E (mm) | F (mm) | G (mm) | Flow Rate (lpm) |
|---|---|---|---|---|---|---|---|
| 0.1 | 0.025 | 9.7 | 0.05 | 3.1 | 4.25 | 0.1 | 124 |
| 0.6 | | | | | | | 107 |
| 1 | | | | | | | 99 |
| 2 | | | | | | | 77 |
| 3 | | | | | | | 63 |
| 4 | | | | | | | 52 |
| 5 | | | | | | | 45 |
| 5.45 | | | | | | | 43 |

The relationship between the width of the outer land 414O and the flow rate in the bend zone may be illustrated as the graph as shown in FIG. 12.

Figure 13:
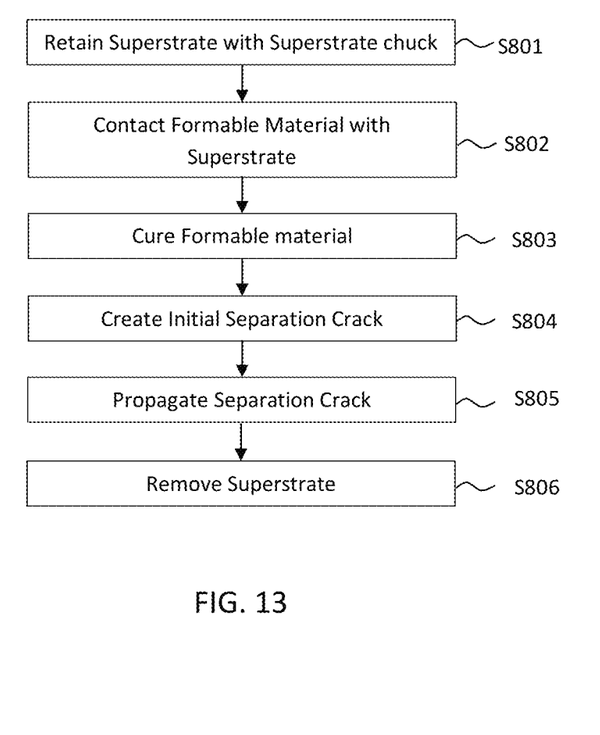
FIG. 13 shows the process flow of a method for manufacturing an article.

FIG. 13 shows a planarization process. In step S801, a superstrate 18 is retained with a superstrate chuck 28 by vacuum in the bending zone created at an outer edge of the superstrate by a recessed peripheral land formed along a periphery of the superstrate chuck 28. The superstrate 18 is brought into contact with a formable material 34 on a substrate 12 in step S802. Once spread of the formable material 34 is complete, the formable material 34 is cured in step S803. In step S804, a separation crack is initiated between the cured formable material 34" and the superstrate 18. A negative (vacuum) pressure at the bending zone is maintained below a threshold while the separation crack propagates along a circumference of the substrate by the periphery land with a sufficient width in step S805. In step S806, the superstrate 18 is removed from the cured formable material 34".

Further modifications and alternative embodiments of various aspects will be apparent to those skilled in the art in view of this description. Accordingly, this description is to be construed as illustrative only. It is to be understood that the forms shown and described herein are to be taken as examples of embodiments. Elements and materials may be substituted for those illustrated and described herein, parts and processes may be reversed, and certain features may be utilized independently, all as would be apparent to one skilled in the art after having the benefit of this description.

What is claimed is:

1. A planarization apparatus, comprising:
 a superstrate chuck, comprising:
  one or more inner lands protruding from a surface of the superstrate chuck; and a peripheral land protruding from the surface of the superstrate chuck along a periphery of the superstrate chuck and encircling the inner lands therein, wherein:

the peripheral land has a height smaller than a height of each of the inner lands; and the peripheral land has a width larger than a width of each of the inner lands, wherein a surface of the peripheral land distal to the surface of the superstrate chuck has a multi-step structure, and wherein the peripheral land includes a highest step at an outer edge and a lowest step between the outer edge and an inner edge of the peripheral land.

2. The planarization apparatus of claim 1, wherein the height of the peripheral land is smaller than the height of the one or more inner lands to create a positive curvature at an outer edge of a superstrate held by the superstrate chuck while spreading a formable material on a substrate.

3. The planarization apparatus of claim 1, wherein the height of the peripheral land is smaller than the height of the inner lands to initiate and propagate a crack between a superstrate held by the superstrate chuck and a formable material.

4. The planarization apparatus of claim 1, wherein the height of the peripheral land is 1 to 100 microns smaller than the height of the inner land.

5. The planarization apparatus of claim 1, wherein the peripheral land has an outer diameter greater than a diameter of the superstrate.

6. The planarization apparatus of claim 1, wherein the width of the inner land is 0.1 mm to 1.0 mm, and the width of the peripheral land is 2.0 mm to 10.0 mm.

7. The planarization apparatus of claim 1, wherein the width of the peripheral land is at least five times larger than the width of the one or more inner lands.

* * * * *